UNITED STATES PATENT OFFICE.

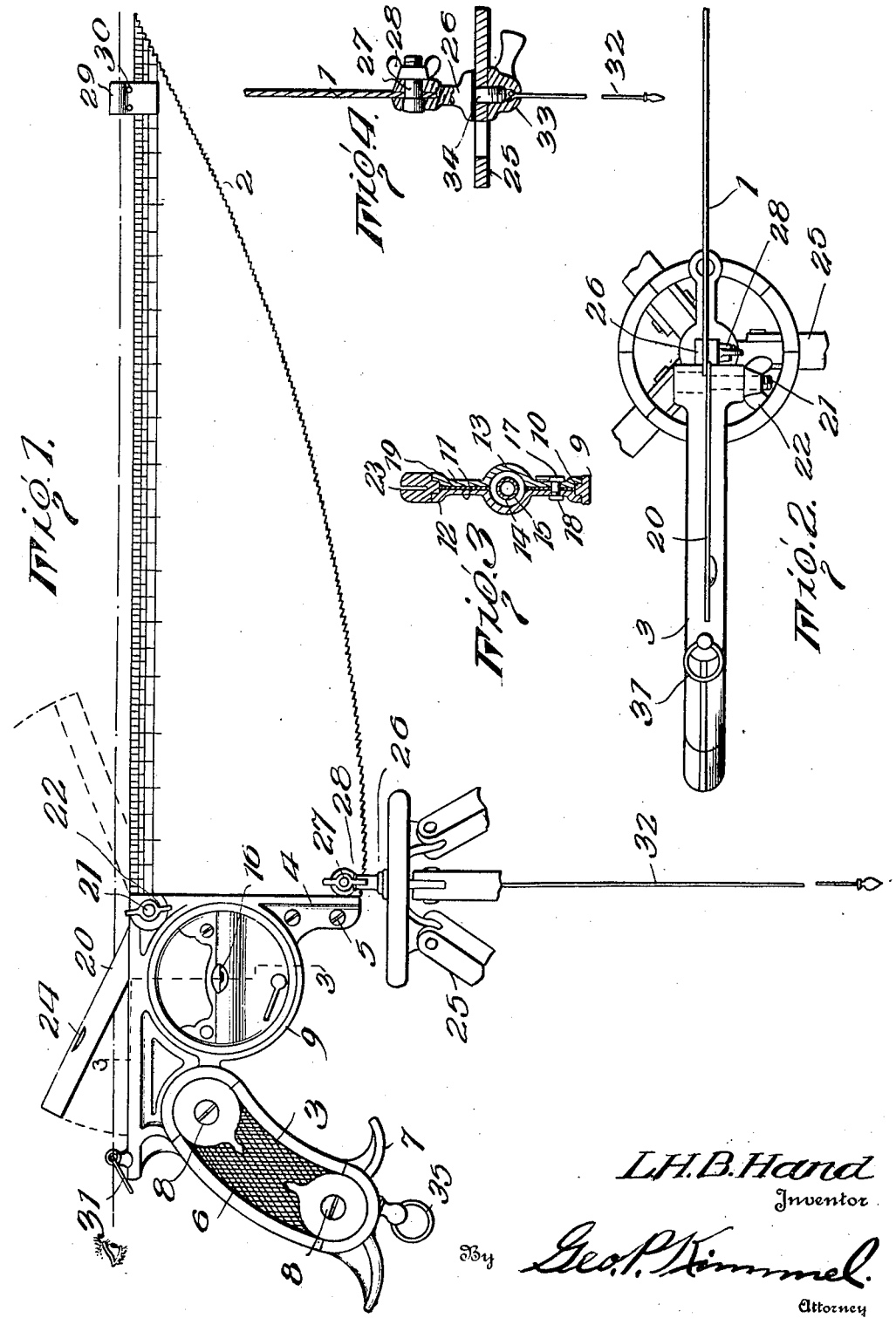

LOUIS H. B. HAND, OF HARVEY, ILLINOIS.

COMBINATION-TOOL.

1,280,994. Specification of Letters Patent. Patented Oct. 8, 1918.

Application filed January 22, 1917. Serial No. 143,638.

*To all whom it may concern:*

Be it known that I, LOUIS H. B. HAND, a citizen of the United States, and resident of Harvey, in the county of Cook and State of Illinois, have invented certain new and useful Improvements in Combination-Tools, of which the following is a specification.

My invention relates to a combination tool, and the invention has for its primary object to provide a combination wood-working tool and level, whereby, the tool may be used for sawing, mitering or beveling, leveling the work upon which the same is being used and for leveling or draining land.

It is also an object of the invention to provide a novel form of saw, so shaped as to permit the same to be used for sawing through lumber without the necessity of starting the same in the cut by the boring of holes and the like, or for cutting lumber so arranged or shaped as to require a straight or horizontal cut, thus, rendering the tool especially desirable for use in cabinet work and the like.

Another object of the invention is to provide a bevel or miter gaging means, which means are adjustably mounted upon the saw and facilitate the making of proper markings upon the work, previous to the cutting operation.

Another important feature of the invention resides in the mounting of a spirit level on the saw handle, the level being adjustable to permit accurate cutting with the same and also accurate positioning of the miter or bevel engaging means.

Still further, the invention also comprehends the provision of sighting means arranged upon the saw and a novel mounting or support for the saw, whereby, the same will be afforded pivotal movement, thus, rendering the device capable of serving as a form of surveying instrument for leveling land.

Other objects of the invention relate to considerations of economy of production, durability in use, and convenience in operation of the several parts entering into the construction of elements and the above defined general organization of said elements.

In order that the invention and the manner of its application may be readily understood by those skilled in the art, I have in the accompanying illustrative drawings and in the following detailed description based thereon, set forth the preferred embodiment of the invention.

In the drawings:

Figure 1 is a side elevation of my improved combination tool, a tripod for pivotally supporting the same being fragmentally shown;

Fig. 2 is a fragmentary top plan thereof;

Fig. 3 is a section taken on the line 3—3 of Fig. 1; and

Fig. 4 is a vertical section in detail showing the mounting of the saw upon the tripod and the arrangement of the plumb bob upon the same.

Having reference to the drawings, wherein like reference numerals designate corresponding parts throughout the several views thereof, there is provided a saw having a blade 1, which blade has its serrated cutting edge curved and tapered toward the outer extremity thereof as at 2, in order that the same may be used to advantage in starting a cut in an article or piece of lumber. It is also to be appreciated, that the cutting edge of the saw blade by reason of its peculiar form will permit the sawing of lumber so shaped or arranged as to require a straight or horizontal cut. A handle 3 having a bifurcated forward clamping portion 4 is adapted to be engaged with the rear end of the saw blade 1, the saw as will be obvious, being passed into the said bifurcated portion 4 and secured to the same by passing screws or other similar fastening devices 5 therethrough. If desired, the grip portions of the handle 3 may be knurled or otherwise roughened as at 6 and provided with a plurality of diverging hand guards or rests 7 upon the lower end thereof. The grip portions of the said handle may be and preferably are formed of hard wood, rubber or the like and are secured in position upon the handle portion through the medium of set screws 8 which are passed through suitably alined openings as formed in the opposite extremities thereof. An annular bearing 9 is formed within the forward portion of the handle 3, at a point in proximity to the bifurcated clamping portion 4 and is provided with a circumferentially disposed lug 10 upon its inner surface, which lug is adapted to serve as means for properly positioning a plurality of disk like clamping plates 11, the said clamping plates having the marginal edges thereof offset as at 12 in order that the same will snugly embrace the circumferentially disposed lug 10 when properly positioned within the annular bearing 9. Complementally formed chambers or channels 13 are arranged within the clamping plates 11, preferably, intermediate certain of the sides thereof and serve as means for receiving a spirit level tube 14 therebetween. A cylindrical packing sleeve 15 is arranged about the said tube 14 and obviously, insures the proper positioning of the same within the complemental ways 13. A portion of the said ways 13 is cut away, as at 16 in order that the bubble within the spirit level tube 14 may be efficiently displayed. To securely unite the clamping plate 11, whereby, to properly position the spirit leveling tube 14 between the same, a bolt 17 is passed through suitably alined openings as formed within the said clamping plate and has turned into engagement with its outer screw threaded extremity, a locking nut 18. Thus, by loosening the locking nut 18, that is, turning the same out of engagement with the bolt 17, adjustment of the spirit level tube 14 within its respective ways 13 is permitted. Furthermore, positioning of the same within the annular bearings 9, may be varied to facilitate the accurate marking with the bevel or miter gage, which will be hereinafter more fully described, also, the positioning of the saw blade 1 with relation to the material to be cut thereby. Upon rotation of the clamping plates 11 within the annular bearing 9, the circumferentially disposed lugs 10 will serve to prevent lateral displacement thereof and will also permit the same to be instantly clamped when the spirit level has been properly adjusted. If desired, a gasket 19 may be interposed between the adjacent faces of the clamping plates 11, for an obvious purpose.

A bevel or miter gage element 20 is pivotally mounted upon the upper forward portion of the handle 3, in proximity to the clamping portions 4, through the medium of a transversely disposed bolt 21, the said bolt being passed through suitably alined openings as formed within the opposite side portions of the bifurcated clamping portions and having turned into engagement with the screw threaded extremity thereof a locking wing nut 22. In order that the bevel or mitering gage element may be folded into an out of the way position when not in use, a longitudinally disposed channel 23 is formed within the upper portion of the handle 3 and is of a length and depth sufficient to fully receive the said element 20 when the same is not in use. To facilitate the removing of the element 20 from the way 23, a recess 24 is formed therein adjacent the upper marginal edge of the same. In adjusting the gage element 20 to various positions to permit the proper marking to be made, it will be appreciated, that by tightening the wing nut 22 upon the bolt 21, the said elements may be clamped in their adjusted position and as a consequence, marking of the lumber or article to be cut is facilitated.

The back of the saw blade 1, is provided with a series of graduations pertaining to linear measurements and may be readily used as a straight edge or rule in laying out or marking various work.

With a view toward providing means whereby the combination tool may be employed as a form of surveying instrument for leveling land and the like, there is provided a tripod, indicated in its entirety by the numeral 25, which tripod has arranged thereon, centrally of the same an upright bifurcated lug 26, the said lug being adapted to receive a portion of the saw blade 1 therebetween, which portion has formed therein a suitable opening through which a bolt 27 as carried upon the opposite portions of the bifurcated lug may be passed and locked in position therein through the medium of a wing nut 28. By so mounting the saw blade 21, pivotal movement thereof is permitted and by varying the engagement of the locking nut 27 with the bifurcated lug 28, such pivotal movement of the said saw blade may be controlled by the user. A leveling sight 29 is arranged forwardly of the saw blade 1 and is secured in position thereon by means of a clamping set screw 30 which is passed through the opposite portions of the same. Upon the rear or outer extremity of the horizontal portion of the handle 3, there is arranged a marker handle 31, the post of which is provided with a horizontally disposed bore, the said bore being arranged in exact parallelism to the back or upper edge of the saw blade 1 and thereby, affording an efficient rear level sight for the device. By this arrangement of sights upon the saw element of my improved tool, the same is rendered capable of serving as means for leveling land or the like and as will be evident, will greatly facilitate grading and other similar operations. The device when being used as a sighting level, is necessarily provided with an uninterrupted straight edge and therefore, the gage element 20 is folded into position within the receiving way 23 as formed within the top portion of the handle 3. To insure proper positioning of the tripod, a plumb line and bob, indicated by the numeral 32 are secured to and depend from a locking cap nut 33, which nut is turned into engagement with the screw threaded lug 34 of the vertically disposed bifurcated lug 26. By so mounting the lug 26 upon the tripod 25, rotary or partial rotary movement of the saw blade 1 is permitted, in order that the same may be moved to such position as may be necessary during the using of the same as a leveling instrument.

Upon the lower extremity of the handle 3, a second marking handle 35 is arranged and serves for an obvious purpose.

It will of course be understood, that when it is desired to use the saw for cutting various articles or lumber, that the same will be removed from engagement with the bifurcated lug 28, by disengaging the bolt and locking nut 27 and 28 therefrom. Furthermore, if desired, the leveling sight 29 may be readily disengaged from the back of the blade 1 by loosening the screw 30 and permitting outward movement of the depending leg portions of the said sighting member.

While I have herein illustrated and described with a considerable degree of particularity, constructional details of the combination tool embodying my invention, it is to be understood, that the invention is not limited to the particular form and arrangement of the several parts, which may be modified within a wide range without departing from the essence of the invention, the construction shown and the description based thereon being intended to be taken in an illustrative rather than a limiting sense.

I claim:

A tool of the class described including a body having a circular aperture therein adapted to form a bearing, a circumferentially extending projecting lug on the inner edge of said aperture, a pair of clamping plates, said plates having their marginal edges offset in order that the same may be adapted to engage the circumferentially disposed lug in the bearing, said plates having complementally formed chambers adapted to receive a spirit level, a bolt extending through said plates, and a locking nut having a handle formed thereon on the projecting end of said bolt whereby said plates are clampingly but releasably engaged to permit their rotation within the bearing for a purpose specified.

In testimony whereof, I affix my signature hereto.

LOUIS H. B. HAND.